A. S. NOONAN.
RACK.
APPLICATION FILED MAR. 11, 1908.

930,410. Patented Aug. 10, 1909.

Witnesses:
Horace H. Crossman
Irving U. Townsend

Inventor
Albert S. Noonan
by Emery and Booth Attys

UNITED STATES PATENT OFFICE.

ALBERT S. NOONAN, OF ROME, NEW YORK.

RACK.

No. 930,410.　　　Specification of Letters Patent.　　　Patented Aug. 10, 1909.

Application filed March 11, 1908. Serial No. 420,347.

*To all whom it may concern:*

Be it known that I, ALBERT S. NOONAN, a citizen of the United States, and a resident of Rome, in the county of Oneida and State of New York, have invented an Improvement in Racks, of which the following description, in connection with the accompanying drawings, is a specification, like characters on the drawings representing like parts.

This invention relates to racks, which, while they may be of general application, are particularly adapted to be secured to vehicles to receive trunks or other receptacles.

In order that the principles of the invention may be clearly understood, I have disclosed a single type or embodiment thereof in the accompanying drawings, wherein—

Figure 1:
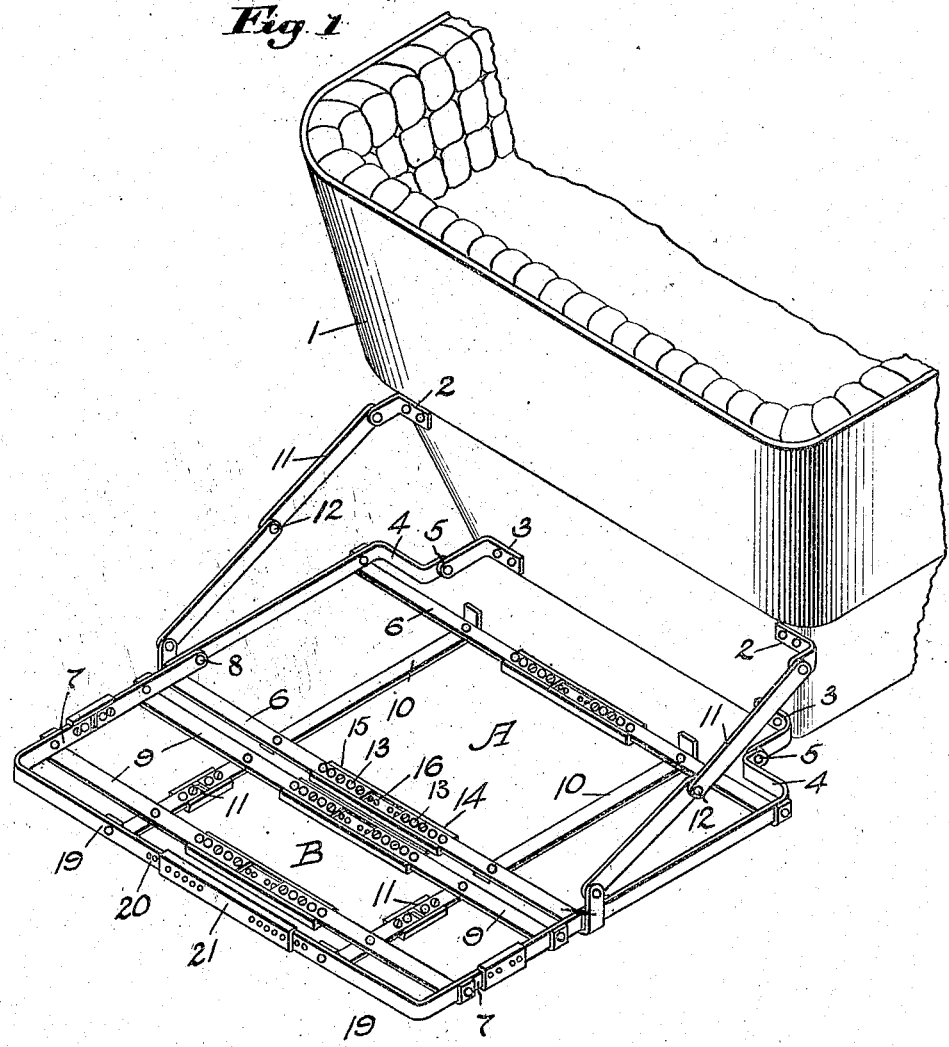
Figure 2:
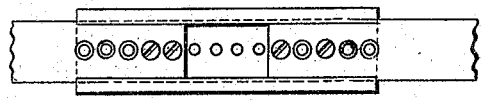
Figure 3:

Figure 1 is a perspective view of one form of my invention applied to the tonneau of an automobile; and Figs. 2 and 3 are details showing the preferred manner of adjusting the rack.

Referring to the single type or embodiment of the invention herein selected for illustration, the vehicle to which the rack embodying my invention is secured is represented at 1, it herein designating the tonneau of an automobile. Racks have heretofore been applied to automobiles, as, for example, to the rear of the tonneau. Inasmuch as different types of automobiles and other vehicles vary in width, it has heretofore been necessary, so far as I am aware, to construct a different size of rack for each type or different width of automobile. This not only has added to the cost of the racks, owing to the different patterns required for different sizes thereof and for other obvious reasons, but has rendered it difficult at times to secure the right size of rack for a particular type or size of automobile, unless a large stock of different sized racks be kept on hand. I am enabled, by my invention, to avoid the necessity of carrying a large stock of different sized racks, and yet am able to supply any size or type of automobile with a proper sized rack. I am furthermore enabled readily to provide a rack fitted to any desired size of trunk that is to be carried thereby, and may if desired adjust a rack, previously secured to an automobile, to accommodate any sized trunk.

The rack, to which my invention may be applied, may be of any suitable construction. Herein, I have represented brackets 2—2 and 3—3 bolted to the vehicle, and preferably to the rear thereof. Although any type of rack may be employed in the practice of my invention, herein I have represented a folding or collapsible rack, the side arms 4—4 whereof are hinged to the brackets 3—3 at 5—5. One or more cross strips or members 6—6 are connected in any suitable manner to the side arms 4—4, as by bolts or the like. The arms 4—4 may be of the full length of the rack, but preferably I make them of less than the full length thereof, and secure thereto or to some other portion of the main body A of the rack a supplemental rack portion B that preferably may be collapsed or folded upon the main body. Herein I have represented side strips or members 7—7 hinged to the strips 4—4 at 8—8 and adapted to be received upon and supported by one of the strips 6 when the rack is in position for use. One or more cross strips 9—9 may be employed to connect the strips 7—7. Preferably, the strips 6—6 and the strips 9—9 are respectively connected by longitudinal strips or members 10—10 and 11—11. If the rack, whether provided with a supporting portion or not, be of the folding type, I may provide any suitable construction for accomplishing that result. Herein, I have represented a pair of arms 11—11 hinged to the brackets 2—2 and to one of the side strips or members 6, each arm being itself formed of members hinged as at 12 to permit the folding of the rack into substantially vertical position.

It is apparent that the rack thus far described may be of any suitable construction and material. In the practice of my invention, I so connect the side or longitudinal members thereof as to permit the rack to be adjusted in width to the requirements of the particular automobile or other vehicle to which it is to be secured. While this may be accomplished in various ways, herein I have represented each of the transverse strips, namely, 6—6 and 9—9, as severed transversely at some suitable point and as provided near adjacent ends of the severed portions with one or more openings 13, whereby an adjustable channeled splicing member 14 having upstanding sides 15—15 may be interposed between such severed ends. It is apparent that such splicing members may be connected in any suitable manner to the severed transverse strips, and preferably adjustably. Herein, however, I have represented each splicing member as provided with a series of openings 16 to receive bolts to be passed therethrough and through the openings in the strips 6. If desired, the strips 6 may be suitably beveled at one or both edges, as represented at 17 in Fig. 3, the upstanding edges of the corresponding splicing member being undercut, as represented at 18. It is apparent that by this construction the transverse member or members do not present a rough or uneven surface to the trunks or other receptacles received upon the rack. If desired the overlapping ends of the transverse strips may be deflected or offset from the plane of the respective strips, the said overlapping strips lying if desired, throughout the greater portion of the length in different longitudinal planes so that the end of each strip is deflected into the plane of the other strip so as to be snugly received by such deflected portion. Preferably, the side strips 7—7 are inwardly bent, as represented at 19—19 and are provided near adjacent ends with openings 20, whereby a splicing member 21, that may be similar to the strip or strips 14, may be secured thereto.

Having thus described one type or embodiment of my invention, I desire it to be understood that although specific terms are employed, they are used in a descriptive and generic sense and not for purposes of limitation, the scope of the invention being set forth in the following claims.

Claims.

1. A rack comprising opposite side members adapted to be suitably supported, a strip extending from each side member toward the other and having a plurality of perforations near adjacent ends, said adjacent ends being beveled, and a channeled undercut splicing piece having a plurality of perforations near opposite ends, whereby said splicing piece may be secured in any position of desired adjustment to said strips.

2. A rack for attachment to the rear of an automobile comprising in combination opposite side members having means to connect them to the rear of an automobile and to support them in a substantially horizontal position, one or more strips extending toward each other from and connected to said side members and arranged in pairs, and one or more splicing pieces adjustably connected to said pair or pairs of strips, the upper face of said strips presenting a smooth upper receiving surface.

3. A rack for attachment to the rear of an automobile comprising in combination opposite side members and means to connect them to the rear of an automobile and to support them in a substantially horizontal position, one or more strips extending toward each other from and connected to said side members, and one or more splicing pieces adjustably connected to said pair or pairs of strips, the entire rack being substantially flat.

4. A rack for attachment to the rear of an automobile comprising in combination opposite side members, means for hinging the same to the rear of an automobile so that they may be supported in a substantially horizontal position, one or more strips extending toward each other from and connected to said side members and arranged in pairs, and one or more splicing pieces adjustably connected to said pair or pairs of strips.

5. A rack for attachment to the rear of an automobile comprising in combination opposite side members having means to connect them to the rear of an automobile and to support them in a substantially horizontal position, one or more strips extending toward each other from and connected to said side members and arranged in pairs, and one or more splicing pieces upon the under side of and connected to said strips, so that the latter present a smooth upper receiving surface.

6. A rack for attachment to the rear of an automobile comprising in combination opposite side members having means to connect them to the rear of an automobile and to support them in a substantially horizontal position, one or more strips extending toward each other from and connected to said side members and arranged in pairs, one or more splicing pieces adjustably connected to said pair or pairs of strips, and a supplemental frame hinged to said rack and adapted when positioned to lie in the plane thereof.

7. A rack for attachment to the rear of an automobile comprising in combination opposite side members having means to connect them to the rear of an automobile and to support them in a substantially horizontal position, one or more strips extending toward each other from and connected to said side members and arranged in pairs, one or more splicing pieces adjustably connected to said pair or pairs of strips, a supplemental frame connected to said main rack and adapted to lie in the plane thereof, and adjustable splicing pieces connecting the members of said supplemental frame.

8. A rack for attachment to the rear of an automobile comprising in combination brackets adapted to be directly attached to the rear of the automobile, opposite side members having means to connect them directly to said brackets, means to support said side members in a substantially horizontal position, one or more strips extending toward each other from and connected to said side members and arranged in pairs, and one or more splicing pieces adjustably connected to said pair or pairs of strips.

9. A rack for attachment to the rear of an automobile comprising in combination opposite side members, a plurality of pairs of strips extending toward each other from and connected to said side members, said side members and strips lying substantially in a single plane, means in substantially said plane for connecting said side members to the rear of the automobile, and a plurality of splicing pieces adjustably connected to said pairs of strips.

10. A rack for attachment to the rear of an automobile comprising in combination opposite side members having means to connect them to the rear of an automobile and to support them in a substantially horizontal position, one or more strips extending toward each other from and connected to said side members and arranged in pairs, one or more splicing pieces adjustably connected to said pair or pairs of strips, and a supplemental frame hinged to the side members of the rack and supported when extended by a pair of said strips and lying when extended in the plane of the rack.

In testimony whereof, I have signed my name to this specification, in the presence of two subscribing witnesses.

ALBERT S. NOONAN.

Witnesses:
  NICHOLAS MCCORMICK,
  THOS. H. MCLAUGHLIN.